United States Patent [19]

Darrow

[11] Patent Number: 5,175,241
[45] Date of Patent: Dec. 29, 1992

[54] POLYIMIDE WITH REDUCED ANHYDRIDE CONTENT

[75] Inventor: David S. Darrow, Olean, N.Y.

[73] Assignee: The Dexter Corporation, Windsor Locks, Conn.

[21] Appl. No.: 458,314

[22] Filed: Dec. 28, 1989

[51] Int. Cl.⁵ ............... C08G 69/28; C08G 73/10; C08G 8/02; C08G 69/26

[52] U.S. Cl. ............... 528/353; 528/125; 528/126; 528/128; 528/170; 528/171; 528/172; 528/173; 528/174; 528/176; 528/183; 528/185; 528/188; 528/220; 528/229; 528/350; 528/351; 528/352

[58] Field of Search ........... 528/125, 126, 128, 176, 528/350, 353, 183, 229, 220, 351, 170, 172, 188, 185, 173, 174, 352, 171

[56] References Cited

U.S. PATENT DOCUMENTS

| | | | |
|---|---|---|---|
| Re. 30,922 | 5/1982 | Heilman et al. | 528/128 |
| 3,528,950 | 9/1970 | Lubowitz | 528/353 |
| 3,745,149 | 12/1973 | Serafini et al. | 528/288 |
| 3,781,249 | 12/1973 | Lubowitz | 528/125 |
| 3,864,309 | 2/1975 | Bilow et al. | 528/183 |
| 4,153,783 | 5/1979 | Gagliani et al. | 528/337 |
| 4,218,555 | 8/1980 | Antonoplos et al. | 528/125 |
| 4,244,853 | 1/1981 | Serafini et al. | 528/353 |
| 4,251,419 | 2/1981 | Heilman et al. | 524/104 |
| 4,255,313 | 3/1981 | Antonoplos et al. | 524/104 |
| 4,299,750 | 11/1981 | Antonoplos et al. | 528/128 |
| 4,305,796 | 12/1981 | Gagliani et al. | 528/353 |
| 4,315,077 | 2/1982 | Gagliani et al. | 521/77 |
| 4,319,000 | 3/1982 | Gagliani et al. | 521/189 |
| 4,332,656 | 6/1982 | Gagliani et al. | 521/189 |
| 4,338,430 | 7/1982 | Edelman | 528/222 |
| 4,365,034 | 12/1982 | Grimes et al. | 528/125 |
| 4,405,770 | 9/1983 | Schoenberg et al. | 526/259 |
| 4,448,957 | 5/1984 | Nagaoka | 528/353 |
| 4,539,342 | 9/1985 | Lee et al. | 528/353 |
| 4,629,777 | 12/1986 | Pfeifer | 528/353 |
| 4,645,823 | 2/1987 | Ai et al. | 528/336 |
| 4,684,714 | 8/1987 | Lubowitz et al. | 528/353 |
| 4,720,539 | 1/1988 | Rabilloud et al. | 528/353 |
| 5,041,524 | 8/1991 | Riel et al. | 528/353 |

OTHER PUBLICATIONS

"FTIR-Studies of PMR-15 Polyimides," J. Polyn. Sci; Part B Polymer Physics, vol. 25, No. 11, Nov., 1987, pp. 2275-2282, Serafini et al.
Serafini-Aerospace application of PMR polyimide composites, Int. Conf. Compos. Mater., ICCM-V, Conf. Proc., 5th 1007-23-1985.
Serafini et al.-Addition Type Polyimides from Solutions of Monomeric Reactants, Mater. Rev. '72, Nat. Sampe (Soc. Aerosp. Mater. Process Eng.) Symp. Exhib. 17th-1972.
Serafini et al.-J Applied Polymer Sci 16, 905-1972.
Lauver et al.-J Applied Polymer Sci 33, 2893-1987.
Lauve et al.-J Polymer Sci, Polymer Chemistry Edition 17, 2529-1979.
Lauver et al.-Stability of PMR-Polyimide Monomer Solutions NTIS N79-16921-1979.
Lauver et al.-Characterization of PMR Polyimides--Correlation of Ester Impurities with Composite Properties NTIS N79-16918-1979.
Yungk et al., PMR-15 Molding Compound Characterization-Paper presented at High Temple Workshop VIII, Riviera Beach, Fla.-Jan. 25-28, 1988.
Serafini, NTIS N83-15364 (1982).
Reed, Proc. Annual Conference-Rein F. Plast/Compos. Inst. 26-E, I-26-E, 4.
Roberts et al., Sample J. 22:24 (1986).

Primary Examiner—John Kight, III
Assistant Examiner—P. Hampton-Hightower
Attorney, Agent, or Firm—Fish & Richardson

[57] ABSTRACT

Polyimide resins, which have reduced anhydride content when molded, are prepared by a novel reaction process that includes reacting an esterified aromatic tetracarboxylic acid or anhydride monomer with a primary aromatic diamine until substantially no free monomer remains to form a polyamide-acid (the molar ratio of esterified monomer to diamine ranging from 1:1 to 1:2); reacting the polyamide-acid with a low molecular weight end-capping agent to form an end-capped polyamide-acid; and heating the end-capped polyamide-acid to form the polyimide.

19 Claims, 2 Drawing Sheets

POLYIMIDE WITH REDUCED ANHYDRIDE CONTENT

BACKGROUND OF THE INVENTION

1. Technical Field

The present invention relates to polyimide resins which have improved rheology during molding and higher physical strength in their final molded product forms. These improvements are due to the higher density of the polyimide resins and the absence of reaction side products and decomposition products.

2. Description of Background Art

As a group, polyimides are very important and useful materials because of their chemical inertness, strength, and temperature resistance. A certain subgroup of the polyimides has additional advantages such as the retention of strength, resiliency and flexibility from cryogenic temperatures to 600° F.; resistance to hydrolysis and ultraviolet degradation; and the capability of undergoing oxidative degradation without generating toxic products or smoke.

This subgroup of polyimides is prepared by reacting an aromatic tetracarboxylic acid compound, e.g., dianhydrides or diester-diacids of 3,3',4,4'-benzophenone tetracarboxylic acid with one or more primary aromatic diamines to form a polyamide-acid. This material is then converted to a polyimide by heating. The polyamide-acid may also contain low molecular weight end caps, e.g., norbornene, substituted norbornene, or their ester counterparts. When polymerizable end caps are used, the application of heat and pressure not only converts the polyamide-acid to a polyimide but effects crosslinking among the polyimides to form a thermoset resin.

High pressure (compression) and low pressure (autoclave) methods have been developed for the final treatment of polyimide impregnated composites, as well as pure polyimide molded articles. It has been found that the single greatest adverse impact on the physical and mechanical strength of the product is the formation of voids during this final treatment. Several references have traced the source of the voids to residual solvents remaining during fabrication or to the presence of tri and tetra esters of the tetracarboxylic acid compound, e.g., 3,3',4,4'-benzophenone tetracarboxylic dianhydride (BTDA), in the monomer solution (Lauver et al. NASA TM-79068 (1979)). Accordingly, tri- and tetraesters of the tetracarboxylic acid compound are avoided in the synthesis of the polyamide-acid intermediate. Additionally, carefully controlled heating during compression molding or autoclave processes has been used to give relatively void free composites.

The present inventor has found another significant source of voids which has not been appreciated by those skilled in the art. The prior art discloses the reaction of the dimethylester of 3,3',4,4'-benzophenone tetracarboxylic dianhydride (BTDE), methylene dianiline (MDA) and norbornene ester (NE) to form high temperature thermoset polyimides (PMR). As generally taught in the art, the three monomers are simultaneously mixed and reacted to form PMR. This leads to the kinetically favored reaction of MDA with NE, rather than BTDE, to form undesirable side products which are no longer capable of oligomerization to form the polyamide-acid, as well as unreacted BTDE monomer. Additionally, this reaction depletes the amount of NE for end-capping. Thus, a significant amount of the polyamide-acid molecules formed by the reaction of BTDE and MDA retain unreacted methylester terminal groups. These terminal groups subsequently form anhydride terminal groups which are susceptible to decomposition and release of CO and $CO_2$ during molding, curing and use of the final resin product. The release of these gaseous products from the decomposition of the anhydride terminal groups leads to bubbles and voids within the resin which significantly and adversely affect the resin rheology and physical strength.

For the above reasons, there is a need in the art for an improved process for the manufacture of high temperature thermoset polyimides of low anhydride content.

Accordingly, it is an object of the present invention to provide polyimides for composites and molded articles that are free of voids resulting from the decomposition of anhydride groups. The lower viscosity also allows more intricately molded parts to be made without voids.

Another object is to provide novel processes for making the aforementioned improved polyimides.

These and other objects of the invention, as well as a fuller understanding of the advantages thereof, can be had by reference to the following description and claims.

SUMMARY OF THE INVENTION

The foregoing objects are achieved according to the present invention by a novel reaction process comprising the following sequential steps:

1. Esterifying an aromatic (i.e., containing one or more aromatic rings) tetracarboxylic acid or anhydride monomer with one or more alkyl alcohols (e.g., methyl, ethyl, or propyl alcohol) to convert one or more of the carboxylate groups of the acid or anhydride to ester groups;
2. Reacting the esterified monomer with a primary aromatic diamine until substantially no free monomer remains to form a polyamide-acid, the molar ratio of the esterified monomer to the diamine ranging from 1:1 to 1:2;
3. Reacting the polyamide-acid with a low molecular weight end-capping agent to form an end-capped polyamide-acid; and
4. Heating the end-capped polyamide-acid to form the polyimide.

By the above described sequential process of reacting the monomers, polyimides can be synthesized substantially free of reaction side products or volatile decomposition products. Preferably, the anhydride content of the polyimide is less than 3% by weight, more preferably less than 1% by weight.

In the aforesaid process, the tetracarboxylic acid or anhydride monomer is preferably the dimethylester of 3,3',4,4'-benzophenone tetracarboxylic dianhydride (CAS No. 2421-28-5, BTDE), pyromellitic dianhydride, or hexafluoroisopropylidene bis phthalic dianhydride. The primary aromatic diamine preferably has the formula

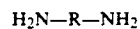

where R is a phenyl group or a group having the formula

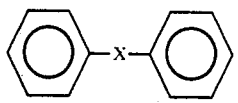

where X is a sulfur, sulfone, oxygen, carbonyl, lower alkylene (e.g., having no more than 4 carbon atoms, e.g., methylene), or fluorinated lower alkylene group. Examples of preferred diamines include methylene dianiline (MDA, CAS No. 101-77-9).

The end-capping agent may be polymerizable (e.g., it could contain polymerizable double bonds), in which case conversion of the end-capped polyamide-acid the polyimide is accompanied by crosslinking to form a thermoset resin. Preferred polymerizable end-capping agents include substituted and unsubstituted norbornenes and their esters, including the monomethyl ester of 5-norbornene-2,3-dicarboxylic anhydride (NE, CAS No. 826-62-0). The end-capping agent may also be a non-polymerizable compound, in which case the final resin is a thermoplastic resin. Examples of suitable non-polymerizable agents include phthalate esters, e.g., methyl esters.

The molar ratio of the ester monomer to the primary aromatic diamine affects the molecular weight of the final polyimide. In general, useful molecular weights are achieved using molar ratios between 1:1 to 1:2. Preferably, the ratio is 2:3.

The reaction of the ester monomer and the primary aromatic diamine is advantageously carried out in a solvent such as methanol, ethanol, propanol or mixtures thereof. Water should be carefully excluded during reaction and handling to prevent hydrolysis. The solution should be prepared so as to contain the highest feasible solids concentration to minimize the guantity of solvent to be removed in subsequent steps. Preferably, solids concentrations should be in the range 50-80%.

The temperature at which polyamide-acid formation proceeds is dependent on the particular monomers and solvents used. The temperature, however, must be high enough to effect complete reaction of the ester monomer in a reasonably short amount of time. To determine whether complete reaction of the ester monomer has occurred, the reaction can be monitored by a technique such as Fourier Transform Infrared Spectroscopy (FTIR).

The end-capping agent is generally added to the polyamide-acid formed between the ester monomer and primary aromatic diamine at a temperature from 50° F. to 160° F.

DESCRIPTION OF THE PREFERRED EMBODIMENTS

Figure 1A:
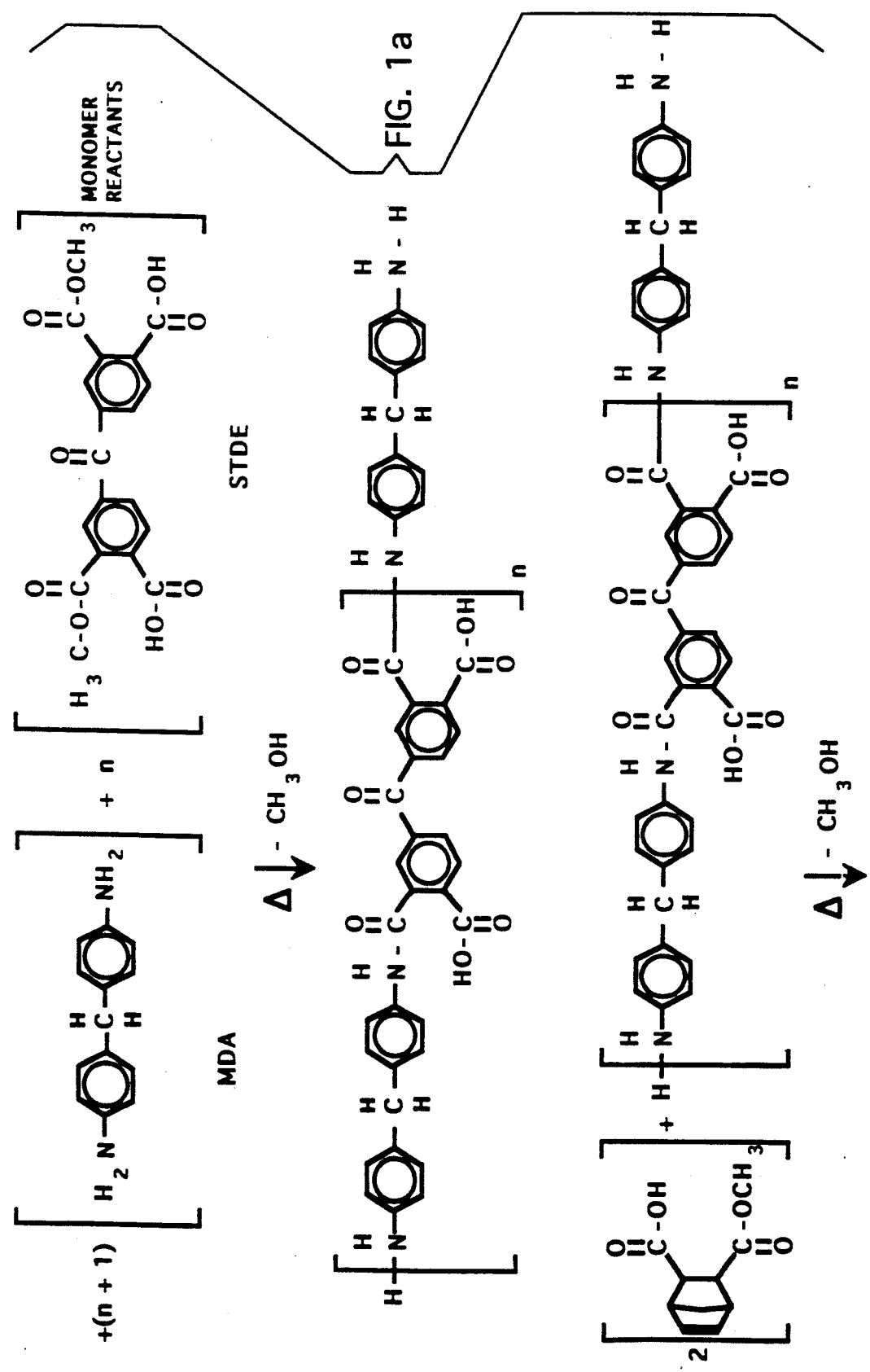
FIGS. 1a and 1b illustrate the sequential route to synthesize the improved high temperature thermoset polyimide PMR-15 (a polyimide resin having a molecular weight of 1500) using the reactants BTDE, MDA and NE.
Figure 1B:
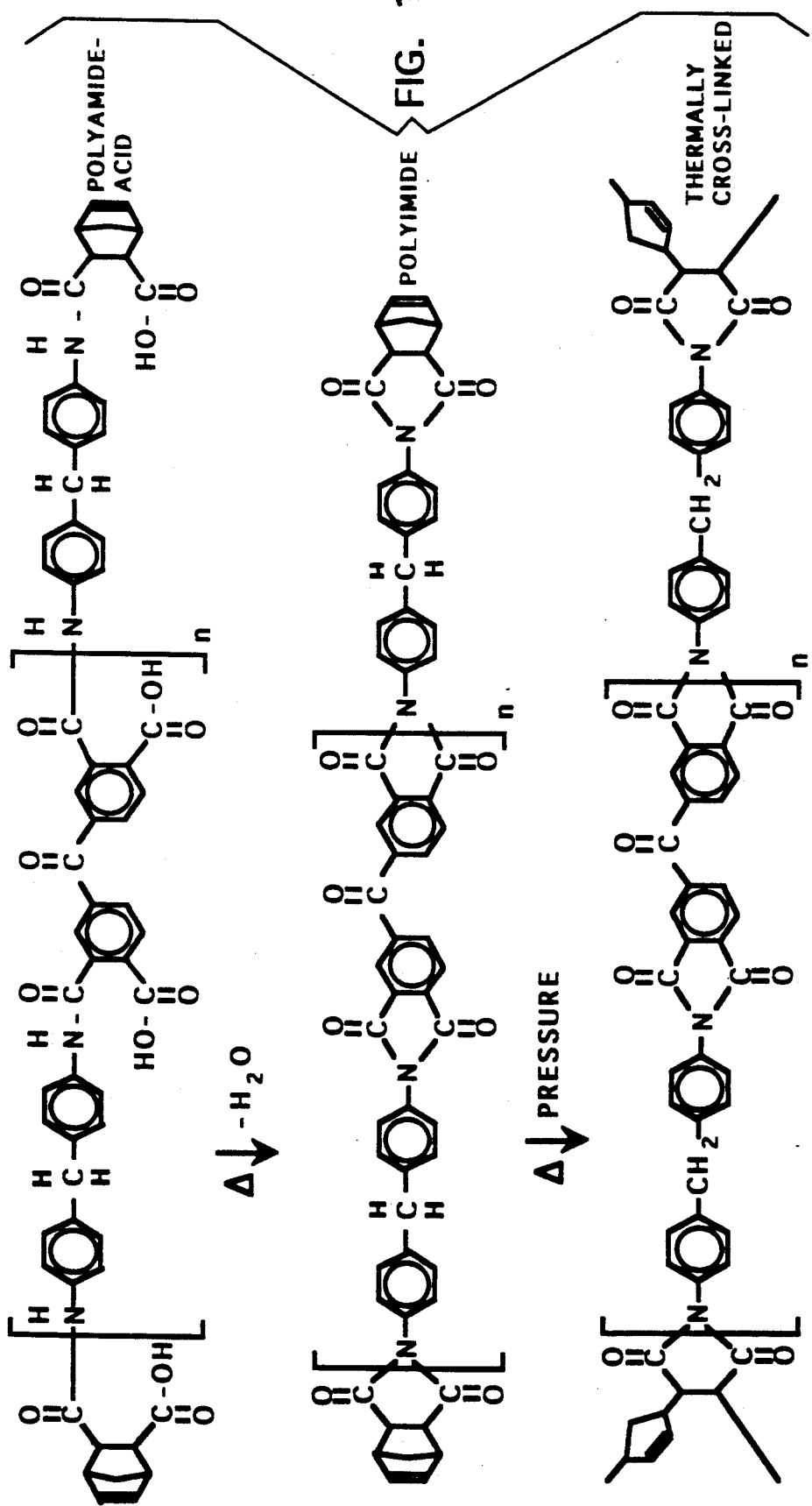

The following nonlimiting examples are intended to illustrate the compositions, processes and products of the invention and the advantages thereof.

EXAMPLE 1

58.5 ml of anhydrous methanol is added to 58.5 gm of BTDA (special acetone treated commercial grade or equivalent purity). The batch is heated slowly to reflux while agitating. After refluxing for about 15 minutes, an exotherm occurs and the slurry becomes clear, indicating the formation of BTDE. Reflux is continued for 15 minutes to ensure complete reaction.

The batch is then cooled to 75°–80° F. before 53.1 gm of flaked or prilled MDA is added to the batch and allowed to dissolve at about the same temperature for about one hour.

The batch is then heated to reflux (about 150° F.) for 1–2 hours to encourage polyamide-acid formation. It is then cooled to 100° F. before 57.0 gm of a methanol solution of 59.9% methyl ester of Nadic or Himic anhydride is added and stirred until uniformly dissolved.

The batch solution is then heated to about 400° F. for 2 hours to evaporate the methanol and to convert the polyamide-acid to the polyimide. The polyimide is then formed into bars by compression molding. The bars are about .28 inches thick, 0.60 inches wide and 5.9 inches long.

EXAMPLE 2 (COMPARATIVE EXAMPLE)

58.5 ml of anhydrous methanol is added to 58.5 gm of BTDA (special acetone treated commercial grade or equivalent purity). The batch is heated slowly to reflux while agitating. After refluxing for about 15 minutes, an exotherm occurs and the slurry becomes clear, indicating the formation of BTDE. Reflux is continued for 15 minutes to ensure complete reaction.

The batch is then cooled to 75 89° F. before 53.1 gm of flaked or prilled MDA and 57.0 gm of a methanol solution of 59.9% methyl ester of Nadic or Himic anhydride are added and stirred until uniformly dissolved. The batch is then stirred at room temperature for 1–2 hours.

The batch solution is then heated to 410° F. for 2 hours to evaporate the methanol and to convert the polyamide-acid to the polyimide. The polyimide is then formed into bars by compression molding. The bars have the same dimensions as Example 1, about 0.29 inches thick, 0.60 inches wide and 5.9 inches long.

EXAMPLE 3

The flex strength and flex modulus tests based on ASTM D790 were performed on the bars made from Examples 1 and 2 and the results were as follows (density, flexural strength and flex modulus tests performed at room temperature):

| Sample | Density (g/cm$^3$) | Flexural Strength (ksi) | Flex Modulus (Msi) |
| --- | --- | --- | --- |
| | | Example 1 | |
| 1 | 1.310 | 20.40 | 0.606 |
| 2 | 1.316 | 22.99 | 0.610 |
| 3 | 1.313 | 20.90 | 0.613 |
| 4 | 1.311 | 19.87 | 0.599 |
| 5 | 1.313 | 19.87 | 0.588 |
| | | Example 2 | |
| 1 | 1.294 | 16.82 | 0.539 |
| 2 | 1.293 | 16.88 | 0.522 |
| 3 | 1.294 | 16.65 | 0.527 |
| 4 | 1.296 | (11.49) | 0.526 |
| 5 | 1.294 | 15.32 | 0.514 |
| 6 | 1.294 | 18.06 | 0.515 |

| | Example 2 | Example 1 |
| --- | --- | --- |
| Average density | 1.294 ± .001 | 1.313 ± .0009 |
| Average flex strength | 16.75 ± 0.97 | 20.81 ± 1.29 |

-continued

| | | |
|---|---|---|
| Average flex modulus | 0.524 ± .009 | 0.603 ± .010 |

A comparison of the above test results indicates the superior physical characteristics of the composition prepared according to the invention based on density, flexural strength and flex modulus at room temperature.

Flexural strength and flex modulus tests were further performed at 500° F. on the bars made from Examples 1 and 2 and the results were as follows (density, flexural strength and flex modulus tests performed at 500° F.):

| Sample | Density (g/cm³) | Flexural Strength (ksi) | Flex Modulus (Msi) |
|---|---|---|---|
| | Example 1 | | |
| 1 | 1.311 | 11.84 | 0.392 |
| 2 | 1.312 | 13.67 | 0.386 |
| 3 | 1.313 | 13.62 | 0.367 |
| 4 | 1.311 | 12.56 | 0.390 |
| | Example 2 | | |
| 1 | 1.295 | 13.99 | 0.334 |
| 2 | 1.294 | 14.87 | 0.326 |
| 3 | 1.297 | 13.91 | 0.333 |
| 4 | 1.309 | 13.31 | 0.332 |
| 5 | 1.296 | 15.37 | 0.326 |
| 6 | 1.286 | 15.83 | 0.330 |

| | Example 2 | Example 1 |
|---|---|---|
| Average density | 1.296 ± .007 | 1.312 ± .001 |
| Average flex strength | 14.55 ± 0.97 | 12.92 ± 0.88 |
| Average flex modulus | 0.330 ± .003 | 0.383 ± .011 |

The test results at 500° F. were determined by procedures described in ASTM D790. The overall flexural strength and flex modulus decreased for both samples when heated to 500° F. However, the sample prepared according to Example 1 remained equal or superior to the sample prepared according to Example 2 based on these measurements.

Other embodiments are within the following claims.

For example, PMR-30 (a polyimide with a molecular weight of 3,000) and PMR-50 (a polyimide with a molecular weight of 5,000) can be prepared by the mole ratio of BTDE to MDA. In the case of PMR-30, the ratio is about 5:6, while for PMR 50 it is about 9:10.

What is claimed is:

1. A method of preparing a polyimide comprising the steps of
    esterifying an aromatic tetracarboxylic acid or anhydride monomer with one or more alkyl alcohols to convert one or two of the carboxylate groups of said acid or anhydride to ester groups;
    reacting the esterified monomer with a primary aromatic diamine until substantially no free monomer remains to form a polyamide-acid,
    the molar ratio of said esterified monomer to said diamine ranging from 1:1 to 1:2;
    reacting said polyamide-acid with a low molecular weight monomeric end-capping agent to form an end-capped polyamide-acid; and
    heating said end-capped polyamide-acid to form said polyimide.

2. The method of preparing a polyimide as defined in claim 1 wherein the tetracarboxylic acid is 3,3',4,4'-benzophenone tetracarboxylic acid.

3. The method of preparing a polyimide as defined in claim 1 wherein the anhydride is pyromellitic dianhydride.

4. The method of preparing a polyimide as defined in claim 1 wherein the anhydride is hexafluoroisopropylidine bis phthalic dianhydride.

5. The method of preparing a polyimide as defined in claim 1 wherein the alkyl alcohol is selected from group consisting of methanol, ethanol and propanol.

6. The method of preparing a polyimide as defined in claim 1 wherein the primary aromatic diamine has the formula $$H_2N-R-NH_2$$

where R is a phenyl group or a group having the formula

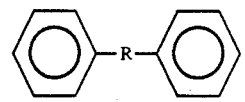

where X is a sulfur, sulfone, oxygen, carbonyl, lower alkylene, or fluorinated lower alkylene group.

7. The method of preparing a polyimide as defined in claim 6 wherein said polyimide is methylene dianiline.

8. The method of preparing a polyimide as defined in claim 1 wherein the molar ratio of the ester monomer to the primary aromatic diamine is about 2:3.

9. The method of preparing a polyimide as defined in claim 1 wherein the molar ratio of the ester monomer to the primary aromatic diamine is about 5:6.

10. The method of preparing a polyimide as defined in claim 1 wherein the molar ratio of the ester monomer to the primary aromatic diamine is about 9:10.

11. The method of preparing a polyimide as defined in claim 1 wherein the end-capping agent is polymerizable.

12. The method of preparing a polyimide as defined in claim 11 wherein the end-capping agent is a norbornene ester.

13. The method of preparing a polyimide as defined in claim 12 wherein the norbornene ester is the monomethyl ester of 5-norbornene 2,3-dicarboxylic acid.

14. The method of preparing a polyimide as defined in claim 1 wherein said end-capping agent is non-polymerizable.

15. The method of preparing a polyimide as defined in claim 14 wherein said end-capping agent is a phthalate ester.

16. A method of preparing a polyimide comprising the steps of
    esterifying 3,3'-4,4'-benzophenone tetracarboxylic acid or anhydride monomer with methyl alcohol to convert one or more of the carboxylate groups of said acid or anhydride to methyl ester groups;
    reacting the esterified monomer with methylene dianiline until substantially no free monomer remains to form a polyamide-acid,
    the molar ratio of said esterified monomer to said methylene dianiline ranging from 1:1 to 1:2;
    reacting said polyamide-acid with a monomeric norbornene ester to form an end-capped polyamide-acid; and
    heating said end-capped polyamide-acid to form said polyimide.

17. A polyimide prepared according to the method of claim 1 or 16.

18. The polyimide of claim 17 wherein the anhydride content of said polyimide is less than 3% by weight.

19. The polyimide of claim 17 wherein the anhydride content of said polyimide is less than 1% by weight.

* * * * *